Sept. 20, 1932.   J. L. WOODBRIDGE   1,878,563
TRAIN LIGHTING AND POWER SYSTEM
Filed Oct. 6, 1931
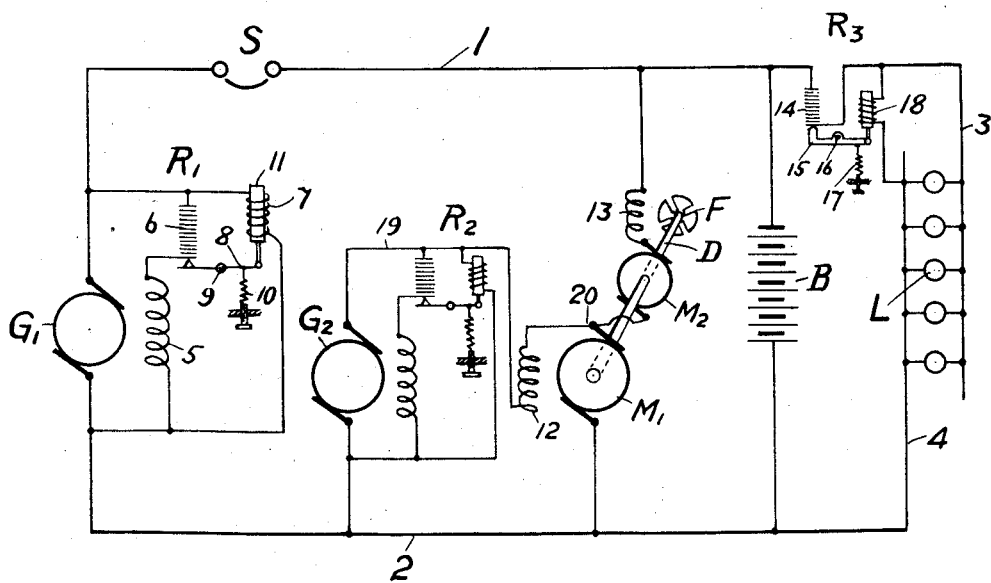
WITNESS:
INVENTOR
Joseph Lester Woodbridge
BY
Augustus B. Stoughton.
ATTORNEY.

UNITED STATES PATENT OFFICE

JOSEPH LESTER WOODBRIDGE, OF PHILADELPHIA, PENNSYLVANIA

TRAIN LIGHTING AND POWER SYSTEM

Application filed October 6, 1931. Serial No. 567,191.

This system is especially adapted for use in connection with the development of electric current for supplying lights and motors for railway cars equipped with air conditioning apparatus in which the demand for power for operating motors for driving compressors and fans or similar devices constitutes a very considerable proportion of the total load. The invention applies particularly to equipment in which the electric current is derived from axle driven generators and in which a storage battery is employed to furnish the necessary current when the car is standing or running at low speed.
In the ordinary axle lighting system in which the lighting load is the principal load, 32 volt lamps are generally used with a 15 cell or a 16 cell lead type storage battery. In the case of air conditioning apparatus however, it is of considerable advantage to use a higher voltage such as 110 volts for the motors in order to reduce the cost of motors and wiring. It is however important to maintain the 32 volt lighting system, as this is now standard on all railroads and it would be very burdensome to attempt to increase the voltage of the lamps for a comparatively few cars on the system in addition to the added cost and space required for the greater number of cells in the battery.

In the standard 32 volt axle lighting system as now generally adopted, the generator is available for delivering current only after the speed of the train reaches a point where the generator voltage exceeds that of the battery. Until this voltage of the generator is reached, the generator is disconnected from the battery and lighting circuit by means of an automatic switch which is designed to close when the generator voltage is slightly greater than that of the battery and open as soon as the generator voltage falls to a point where it can no longer furnish current to the battery. As a result of this arrangement, there are considerable periods of time when the train is in motion but at a speed at which the generator is not furnishing any output although it could furnish a certain amount of current at a voltage below normal if there were any way in which such output could be utilized.

My invention is designed to overcome the difficulties cited above by providing two axle driven generators of which one is designed in accordance with the present standard practice for nominal 32 volt operation in connection with a 15 cell or a 16 cell storage battery and 32 volt lamps. The second axle driven generator is designed to operate at a considerably higher voltage, for example 110 volts, but the arrangement is such that a considerable output may be obtained from this generator at low speeds and voltages considerably below the normal voltage. In fact this machine may begin to deliver output as soon as its voltage rises to a point where it will overcome the voltage drop in the circuit to which it is connected as will be explained hereafter.

In carrying out this invention I provide two motors mechanically connected to each other and to the compressor or the fan or circulating pump as the case may be. These two motors are connected in series across the battery and the second or high voltage generator is connected to a point in the circuit between the two motors.

The accompanying drawing shows diagrammatically a system embodying features of the invention.

In this drawing $G_1$ is the standard 32 volt lighting generator which may be driven by any suitable means from one of the car axles. The field 5 of this generator may be controlled by any suitable controlling device here shown as a regulator $R_1$ consisting of a carbon pile 6 connected in series with the field winding 5, the pressure on this carbon pile being controlled by a lever 8, pivoted at 9 and actuated by the core 11 of the solenoid 7 connected across the generator terminals, the pull of the core 11 being opposed by a spring 10. This field regulator is no part of the present invention and any of the well known forms of regulator may be employed.

This generator $G_1$ is connected to the circuit 1, 2 through the automatic switch S which may be of any well known design. Across the circuit 1, 2 is connected the storage battery B and the lighting circuit 3, 4 supplying the lamps L. In series with the conductor 3 of the lighting circuit is shown a lamp regulator $R_3$ which may be of any well known design, here shown as consisting of the carbon pile 14 connected in series with the load, the pressure on which pile is controlled by a lever 15 pivoted at 16, whose action is produced by the effect of the solenoid 18 connected across the lighting circuit 3, 4 opposed by the spring 17.

Across the circuit 1, 2 are connected in series the motors $M_1$ and $M_2$ which are mechanically connected to each other and to the fan F by means of the shaft D. The field of the motor $M_2$ is shown at 13, being connected in series between the armature and conductor 1. The field of the motor $M_1$ is shown at 12 and is connected between the upper brush of generator $G_2$ and a point 20 in the circuit between the two motors $M_1$ and $M_2$ by means of conductor 19. The generator $G_2$ is arranged to be driven by one car axle and when running above its critical speed is designed to develop a comparatively high voltage, for example 110 volts. The field of the generator $G_2$ is controlled by any suitable automatic field regulator illustrated at $R_2$ similar to a regulator $R_1$ shown in connection with generator $G_1$. It will be understood that this field regulator forms no part of the present invention and any suitable device may be used for limiting the voltage of the generator after it reaches a critical speed. It will be noted that no automatic switch is included in the circuit between the generator $G_2$ and the point 20 where it is connected to the motor circuit.

The operation of this system is as follows: When the car is standing neither the generator $G_1$ or $G_2$ are developing voltage and the entire load of the lamps and motors is carried by the battery B. The entire power for driving the fan F will then be developed by the motor $M_2$, operating as a series motor connected across the battery. The armature of the motor $M_1$ will be rotating, being connected on the same shaft with that of motor $M_2$ and the current passing through the motor $M_2$ will be divided, a portion passing through the armature of the motor $M_1$ and a portion passing through the field 12, conductor 19, and the armature of generator $G_2$. The field winding 12 is so connected that current passing from the point 20 through 12, 19 and $G_2$ as described above will develop a voltage in the armature of $M_1$ in the direction to reduce the voltage which causes the flow of current from the point 20 through the field 12 and the action of this field will therefore tend to keep the voltage of the motor $M_1$ at a point slightly above zero. The design of the motor $M_2$ may be such as to give a speed for the fan F considerably below its normal speed, thus reducing the load on the battery when the car is standing idle. Inasmuch as these periods of standing are of short duration corresponding to station stops, it is permissible to reduce the load of the fan F during these periods.

As soon as the train is in motion, the generator $G_2$ begins to develop voltage, and as soon as this voltage exceeds the drop in the armature of motor $M_1$, the direction of current in the field winding 12 will be reversed and the generator $G_2$ will begin to deliver current through the field winding 12 and the armature of motor $M_1$. The direction of current in the field winding 12 will now be such as to produce a counter E. M. F. in the armature of $M_1$, assisting to drive this as a motor. Thus the generator $G_2$ begins to deliver its output at very low speeds, appreciably below the speed at which the generator $G_1$ is available.

As soon as the generator $G_2$ begins to deliver current the voltage of the point 20 increases above that of conductor 2, reducing the voltage across the motor $M_2$ and therefore reducing the current required from the battery B. As the speed of the generator $G_2$ continues to increase, its voltage reaches a value equal to that of the battery B and under these conditions no current will flow through the armature of motor $M_2$ and the motor $M_1$ will be doing all the work. The voltage of generator $G_2$ as the speed increases, will rise still further since this machine is designed for comparatively high voltage and as soon as the voltage of $G_2$ exceeds that of the battery the current in the armature of $M_2$ and its field winding 13 will be reversed but because of the simultaneous reversal of current in the armature and the field, $M_2$ will still run as a series motor but will now be deriving its power from the generator $G_2$ and the current passing through $M_2$ will relieve the battery B of a part or all of the lamp load and any surplus will be utilized for charging the battery. During this increase in the train speed, the generator $G_1$ will reach its critical value and the automatic switch S will close and the two generators will then be delivering power to the system.

It will be understood of course that various modifications in the design of the motors $M_1$ and $M_2$ may be made to produce any desired division of load between them under the various conditions of operation. For example, it is obvious that shunt field windings could be added to either or both of these motors.

It will be understood that more than one pair of motors may be connected across the circuit 1, 2 and to the generator $G_2$ as indicated in the drawing. It will also be noted that even with the generator $G_1$ disconnected and out of service the balance of the apparatus will form an operative combination since the generator $G_2$ is adapted to furnish current for driving the motors $M_1$ and $M_2$ and also for supplying current to the lamps and to the battery.

I do not intend to be limited in the practice of my invention save as the scope of the prior art and of the attached claims may require.

I claim:

1. In combination, a source of substantially constant voltage, a source of variable voltage, two motors whose rotors are mechanically connected and whose armatures are electrically connected in series across the constant voltage source, a field winding for one of said motors connected in series with its armature and the constant voltage source, and a field winding for the other motor connected in series with its armature and the variable voltage source.

2. In combination, a storage battery, a lighting circuit connected thereto, a variable speed generator, an automatic switch adapted to connect and disconnect said generator to and from the battery, two motors having their rotors mechanically connected and their armatures electrically connected in series across the battery, a field winding for one of the motors connected in series with its armature and the battery, a field winding for the second motor having one terminal connected to a point in the circuit between the two motors and a second variable speed generator connected between the other terminal of said field winding and the opposite terminal of the second motor.

JOSEPH LESTER WOODBRIDGE.